(12) United States Patent
Peng et al.

(10) Patent No.: US 10,669,187 B2
(45) Date of Patent: Jun. 2, 2020

(54) PINK ALUMINOSILICATE GLASS

(71) Applicant: CHINA TRIUMPH INTERNATIONAL ENGINEERING CO., LTD., Shanghai (CN)

(72) Inventors: Shou Peng, Shanghai (CN); Xin Cao, Shanghai (CN); Jiedong Cui, Shanghai (CN); Lifen Shi, Shanghai (CN); Youle Wang, Shanghai (CN); Qiang Gao, Shanghai (CN); Wei Hong, Shanghai (CN)

(73) Assignee: CHINA TRIUMPH INTERNATIONAL ENGINEERING CO., LTD., Putuo District, Shanghai (CN)

(*) Notice: Subject to any disclaimer, the term of this patent is extended or adjusted under 35 U.S.C. 154(b) by 21 days.

(21) Appl. No.: 15/535,039

(22) PCT Filed: Apr. 29, 2015

(86) PCT No.: PCT/CN2015/077767
§ 371 (c)(1),
(2) Date: Nov. 2, 2017

(87) PCT Pub. No.: WO2016/090819
PCT Pub. Date: Jun. 16, 2016

(65) Prior Publication Data
US 2018/0044224 A1   Feb. 15, 2018

(30) Foreign Application Priority Data

Dec. 10, 2014 (CN) .......................... 2014 1 0752547

(51) Int. Cl.
*C03C 3/095* (2006.01)
*C03C 4/02* (2006.01)
*C03C 1/00* (2006.01)

(52) U.S. Cl.
CPC .............. *C03C 3/095* (2013.01); *C03C 1/004* (2013.01); *C03C 4/02* (2013.01); *C03C 2204/00* (2013.01)

(58) Field of Classification Search
CPC .... C03C 3/85; C03C 3/87; C03C 3/91; C03C 3/93; C03C 3/95; C03C 4/02; C03C 21/002; C03C 14/008
See application file for complete search history.

(56) References Cited

U.S. PATENT DOCUMENTS

2006/0211563 A1   9/2006   Arbab et al.
2007/0243993 A1   10/2007  Heithoff et al.
(Continued)

FOREIGN PATENT DOCUMENTS

CN   104445932 A   3/2015
TW   201311601     3/2013

*Primary Examiner* — Noah S Wiese
(74) *Attorney, Agent, or Firm* — Tianhua Gu; Global IP Services

(57) ABSTRACT

A pink aluminosilicate glass, comprising: a glass former, a network intermediate oxide, a network modifier oxide, a network former oxide, a network modifier, a colorant and a clarificant, wherein the glass former is $SiO_2$, the network modifier oxide is CaO, MgO, $K_2O$ and $Na_2O$, the network former oxide is $B_2O_3$, and the network modifier is $ZrO_2$ and SrO. This glass is pink in visible light, has a good visual effect, and has a relatively high thermal stability, and can improve the usage safety in harsh working environments.

3 Claims, 2 Drawing Sheets

(56) References Cited

U.S. PATENT DOCUMENTS

2009/0062103 A1    3/2009  Broughton et al.
2014/0154440 A1*   6/2014  Iida .................. C03C 3/085
                                                      428/34.4

* cited by examiner

PINK ALUMINOSILICATE GLASS

FIELD OF INVENTION

The invention relates to a pink aluminosilicate glass, and more specifically provides a composition of a glass substrate which is pink in visible light and has a strain point greater than 550° C.

DESCRIPTION OF RELATED ARTS

With the continuous development of high-rise buildings, mechanical and thermal requirements for raw glass sheets used in high-rise buildings are higher and higher, and aluminosilicate glass is the best choice. Pink glass as a glass plate with special color can be used for building decoration. The combination of the two can play their respective advantages, expand the application of basic glass, and increase the economic benefits of traditional industries.

Chinese Patent CN1037676C discloses a composition of a high borosilicate glass used in the photochromic field, which is composed mainly of $SiO_2$, $Al_2O_3$, $B_2O_3$ and $R_2O$, wherein the $B_2O_3$ content is more than 16% and the content of added $Er_2O_3$ is less than 0.5%.

Chinese Patent CN 104071981A provides a pink glass-ceramic plate and its production method, which is used for the production of the glass-ceramic plate by taking $SiO_2$, $Al_2O_3$ and CaO as the main composition, $Co_2O_3$ as a main colorant, and $P_2O_5$ as a nucleating agent.

SUMMARY OF THE PRESENT INVENTION

The invention aims to provide a pink aluminosilicate glass, which has the characteristics of good visual effect and high thermal stability, and has possibility of large-scale industrial production.

In order to achieve the above aim, there is provided a pink aluminosilicate glass comprising a glass former, a network intermediate oxide, a network modifier oxide, a network former oxide, a network modifier, a colorant, and a clarificant.

In some embodiments, the colorant is a rare earth oxide.

In some embodiments, the rare earth oxide is $Er_2O_3$.

In some embodiments, the content of $Er_2O_3$ is 0.01-3% by mass of the total mass of the glass.

In some embodiments, the glass former is $SiO_2$ accounting for 55%-80% by mass of the total mass of the glass.

In some embodiments, the network intermediate oxide is $Al_2O_3$ accounting for 5-22% by mass of the total mass of the glass.

In some embodiments, the network modifier oxide is CaO accounting for 1-10% by mass of, MgO accounting for 1-10% by mass of, $K_2O$ accounting for 1-10% by mass of, and $Na_2O$ accounting for 1-10% by mass of the total mass of the glass.

In some embodiments, the network former oxide is $B_2O_3$ accounting for 0-10% by mass of the total mass of the glass.

In some embodiments, the network modifier is $ZrO_2$ accounting for 0-5% by mass of, and SrO accounting for 0-10% by mass of the total mass of the glass.

In some embodiments, the clarificant is SnO accounting for 0.01-1% by mass of the total mass of the glass.

The glass according to the invention can provide a glass formula which exhibits pink in visible light and has a high thermal stability index. The aluminosilicate glass provided by the patent has good visual effect and can be used better in high-grade building glass, and improves the safety of use for harsher working environments due to higher thermal stability.

Other aspects and advantages of the invention will become apparent from the following description of the main ideas of the invention by way of example with reference to the drawings.

BRIEF DESCRIPTION OF THE DRAWINGS

The above and other features and advantages of the invention will become more apparent from the following detailed description taken in conjunction with the drawings, in which.

DETAILED DESCRIPTION OF THE PREFERRED EMBODIMENTS

Figure 1:
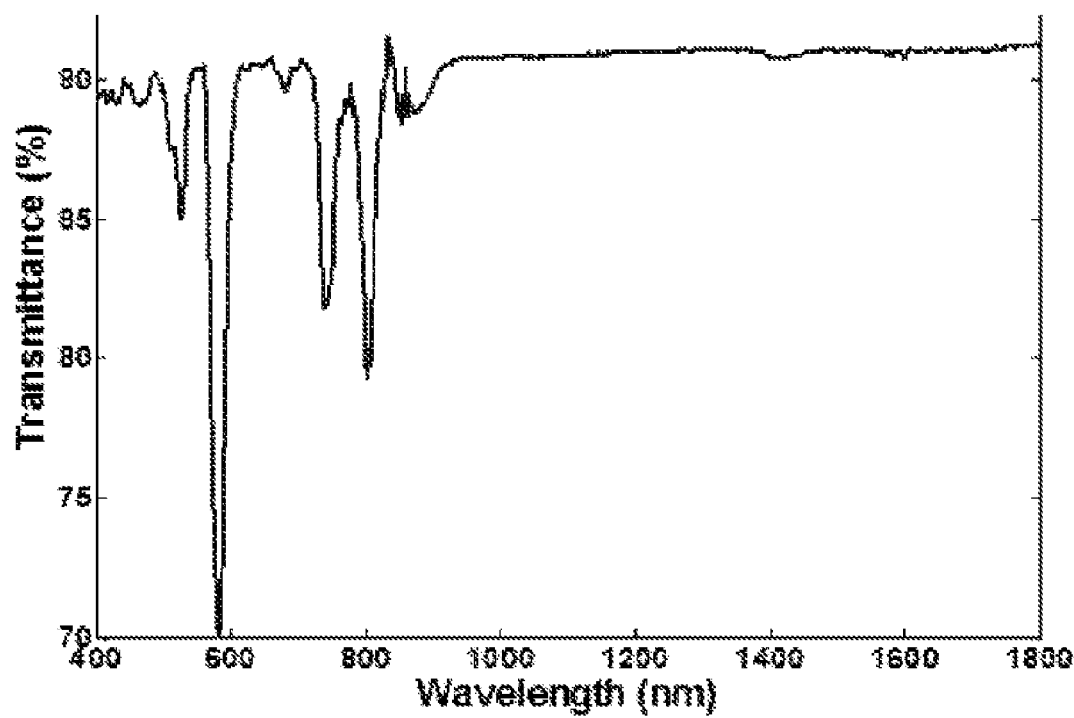
FIG. 1 is a curve graph of transmittance according to Example 1 of the invention.

Referring to the drawings of the specific examples of the invention, the invention will be described in more detail below. However, the invention may be embodied in many different forms and should not be construed as being limited by the examples set forth herein. In contrast, these examples are presented to achieve full and complete disclosure, and those skilled in the art will be fully aware of the scope of the invention.

A pink aluminosilicate glass according to an example of the invention is described in detail to include a glass former, a network intermediate oxide, a network modifier oxide, a network former oxide, a network modifier, a colorant, and a clarificant. In some embodiments, the colorant is a rare earth oxide.

The rare earth oxide is $Er_2O_3$. The content of the $Er_2O_3$ is 0.01-3% by mass of the total mass of said glass. The glass former is $SiO_2$ accounting for 55%-80% by mass of the total mass of the glass. The network intermediate oxide is $Al_2O_3$ accounting for 5-22% by mass of the total mass of the glass. The network modifier oxide is CaO accounting for 1-10% by mass of, MgO accounting for 1-10% by mass of, $K_2O$ accounting for 1-10% by mass of, and $Na_2O$ accounting for 1-10% by mass of the total mass of the glass. The network former oxide is $B_2O_3$ accounting for 0-10% by mass of the total mass of the glass. The network modifier is $ZrO_2$ accounting for 0-5% by mass of, and SrO accounting for 0-10% by mass of the total mass of the glass. The clarificant is SnO accounting for 0.01-1% by mass of the total mass of the glass.

$SiO_2$ is introduced as the glass former and is the main component of the glass skeleton. When the content of $SiO_2$ is less than 50%, the physical and chemical properties of the glass substrate are poor, and the content is preferably 55% to 80% in the composition of the formula.

$Al_2O_3$ is introduced as the network intermediate oxide, and can greatly improve the chemical stability, elastic modulus and hardness and other characteristics of the glass, but addition of larger amount of $Al_2O_3$ will increase the melting temperature of the glass and increase the viscosity of the glass. The advantages and disadvantages are integrated in the formula, and the content of $Al_2O_3$ is preferably more than or equal to 5% and less than or equal to 22%, so that the glass sheet is guaranteed to (1) have good physical and chemical properties; and (2) can be easily prepared by using the existing preparation processes.

CaO is introduced as the network modifier oxide, and can reduce the viscosity of the glass at high temperature and promote the melting and clarification of the glass. However, when the content is high, it is easy to make the glass brittle. The content is preferably 1-10% in the formula.

MgO is introduced as the network modifier oxide, and can improve the elastic modulus of the glass body. CaO is replaced with a small amount of MgO to reduce the hardening speed of the glass and improve the molding performance. In the formula, the content of MgO is preferably 1-10%.

$K_2O$ is introduced as the network modifier oxide, and can reduce the melting temperature of the glass, but higher content will reduce the various properties of the glass body. In the formula, the content is preferably 1-10%.

$Na_2O$ is introduced as the network modifier oxide, and can reduce the melting temperature and high-temperature viscosity of the glass, but the introduction of too high content of $Na_2O$ will reduce the physical and chemical properties of the glass body. In the formula, the content is preferably 1-10%, which can achieve the following purposes: (1) the good physical and chemical properties of the glass body will not be greatly affected; and (2) the glass has good preparation property, and the difficulty in preparing the product of the existing processes is reduced.

$B_2O_3$ is introduced as the network modifier oxide, and due to addition of $B_2O_3$, a non-bridged oxygen bond carried by the alkali metal is changed into a bridge oxygen bond to improve the properties of the glass, and $B_2O_3$ can reduce the high-temperature viscosity of the glass and improve the suitability of the process. The content is preferably 0-10% in the formula.

$ZrO_2$ is introduced as the network modifier into the glass, and can reduce the thermal expansion coefficient of the glass and improve the alkali resistance of the glass, but at the same time increase the high-temperature viscosity of the glass. The content is preferably 0-5% in the formula.

SrO is introduced as the network modifier, and its role is between CaO and BaO. In the formula, the content of SrO is preferably 0-10%.

$Er_2O_3$ rare earth oxide is mainly used as the colorant in the patent, and is preferably 0.01-3% in the formula depending on the degree of coloring.

SnO is a redox-type clarificant, and promotes the clarification of molten glass through valence-variable adsorption and release of oxygen. In the formula, SnO is preferably one composition of the clarificant and the content is 0.01-1%.

The glass is pink in the visible light, and can meet the needs of high-grade building decoration glass. The glass has a strain point more than 550° C.; and the pink aluminosilicate glass has a higher softening point and better thermal stability, and can be used in harsh environments to improve the stability of the long-term use of the glass.

In the preparation of the above glass, a mixture of SnO and $Na_2SO_4$ is used as the clarificant. The glass provided by the invention has high viscosity in high temperature state, and it is necessary to select a specific combination of clarificant. SnO and $Na_2SO_4$ are selected here, which can effectively promote the clarification of the molten glass in the high temperature state and improve the product quality. The total content of the clarificant is 0.1-3% of the content of the batch, wherein the SnO content accounts for 10%-80% of the total content of the clarificant; and the clarificant is added as the modifier for promoting the clarification of the glass and basically does not enter the glass structure, and in order to guarantee the quality of the glass body, the content is controlled to be not higher than 3% of the total content. Such glass substrates are suitable for large-scale industrial production by a glass float process; and the glass formula provided by the patent has wide applicability and can be suitable for large-scale manufacture in most of operating float production lines at present.

The glass according to the examples of the invention will now be described in detail with reference to the drawings.

Example 1

In the example, the aluminosilicate glass was melted in a melting furnace, and the basic composition design adopted in the example was shown in Table 1, the clarificant combination was shown in Table 2, and analytically pure raw materials were adopted. After the raw materials were prepared according to the formula, the glass batch was placed in the melting furnace and heated at a rate of 3° C./min to 1650° C. and kept for two hours. The molten glass was then poured into a mold and molded, and annealed at a cooling rate of 2° C./min in an annealing furnace at the annealing temperature of 600° C. until cooled to room temperature, and the sample was taken out for cutting, polishing, and testing.

TABLE 1

Basic glass composition of Example 1 (500 g glass batch)

| $SiO_2$ | $Al_2O_3$ | MgO | $K_2O$ | $Na_2O$ | CaO | $B_2O_3$ | $ZrO_2$ | SrO | $Er_2O_3$ |
|---|---|---|---|---|---|---|---|---|---|
| 344.5 | 60 | 17 | 8.5 | 62.5 | 2.5 | 0 | 0 | 0 | 2.5 |

TABLE 2

Clarificant composition of Example 1 (500 g glass batch)

| $Na_2SO_4$ | SnO |
|---|---|
| 2.5 | 2.5 |

The glass sample prepared in the example was tested and the test results were shown in Table 3. The transmittance curves were shown in FIG. 1:

TABLE 3

Test results of Example 1

Strain point (° C.)

| 560 | Transmittance curves | See FIG. 1 |
|---|---|---|

The results reflect that the glass formula provided by the patent can achieve good effects.

Example 2

In the example, the aluminosilicate glass was melted in a melting furnace, and the basic composition design adopted in the example was shown in Table 4, the clarificant combination was shown in Table 5, and analytically pure raw materials were adopted. After the raw materials were prepared according to the formula, the glass batch was placed in the melting furnace and heated at a rate of 3° C./min to 1650° C. and kept for two hours. The molten glass was then poured into a mold and molded, and annealed at a cooling rate of 2° C./min in an annealing furnace at the annealing temperature of 600° C. until cooled to room temperature, and the samples were taken out for cutting, polishing, and testing.

TABLE 4

Basic glass composition of Example 2 (500 g glass batch)

| $SiO_2$ | $Al_2O_3$ | MgO | $K_2O$ | $Na_2O$ | CaO | $B_2O_3$ | $ZrO_2$ | SrO | $Er_2O_3$ |
|---|---|---|---|---|---|---|---|---|---|
| 57.2 | 20.9 | 3.3 | 1.5 | 10.5 | 0.4 | 4.0 | 1.0 | 0 | 1.0 |
| 286 | 104.5 | 16.5 | 7.5 | 52.5 | 2 | 20 | 5 | 0 | 5.0 |

TABLE 5

Clarificant composition of Example 2 (500 g glass batch)

| $Na_2SO_4$ | SnO |
|---|---|
| 0.5 | 1.0 |

The glass samples prepared in the example were tested and the test results were shown in Table 6. The transmittance was shown in FIG. 2:

TABLE 6

Test results of Example 2

Figure 2:
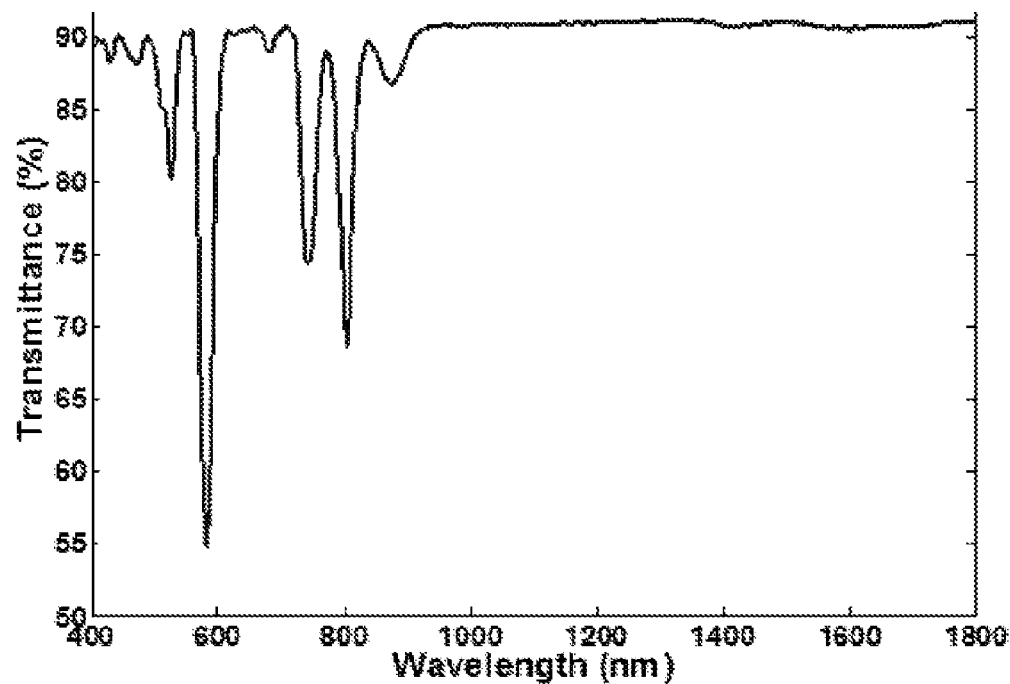
FIG. 2 is a curve graph of transmittance according to Example 2 of the invention.

| Strain point (° C.) | | |
|---|---|---|
| 560 | Transmittance curves | See FIG. 2 |

Example 3

In the example, the aluminosilicate glass was melted in a melting furnace, and the basic composition design adopted in the example was shown in Table 7, the clarificant combination was shown in Table 8, and analytically pure raw materials were adopted. After the raw materials were prepared according to the formula, the glass batch was placed in the melting furnace and heated at a rate of 3° C./min to 1650° C. and kept for two hours. The molten glass was then poured into a mold and molded, and annealed at a cooling rate of 2° C./min in an annealing furnace at the annealing temperature of 600° C. until cooled to room temperature, and the samples were taken out for cutting, polishing, and testing.

TABLE 7

Basic glass composition of Example 3 (500 g glass batch)

| $SiO_2$ | $Al_2O_3$ | MgO | $K_2O$ | $Na_2O$ | CaO | $B_2O_3$ | $ZrO_2$ | SrO | $Er_2O_3$ |
|---|---|---|---|---|---|---|---|---|---|
| 57.5 | 17 | 3 | 1 | 1 | 4.5 | 7 | 0 | 7.0 | 1.8 |
| 278.5 | 85 | 15 | 5 | 5 | 22.5 | 35 | 0 | 35 | 9 |

TABLE 8

Clarificant composition of Example 3 (500 g glass batch)

| $Na_2SO_4$ | SnO |
|---|---|
| 0.4 | 1 |

The glass samples prepared in the example were tested and the test results were shown in Table 9. The transmittance curves were shown in FIG. 3:

TABLE 9

Test results of Example 3

Figure 3:
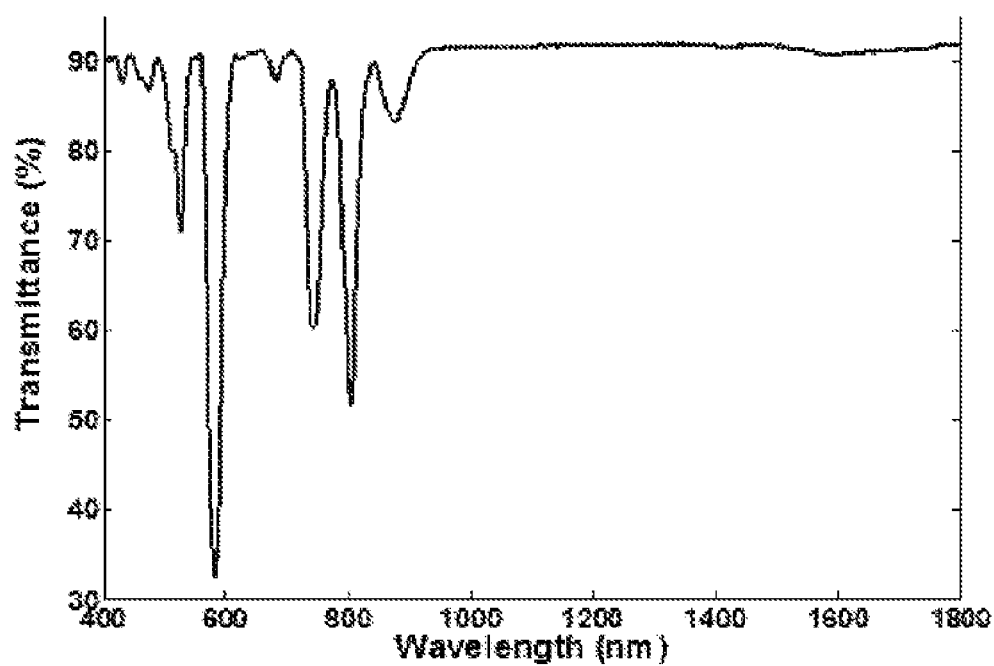
FIG. 3 is a curve graph of transmittance according to Example 3 of the invention.

| Strain point (° C.) | | |
|---|---|---|
| 680 | Transmittance curves | See FIG. 3 |

Example 4

In the example, the aluminosilicate glass was melted in a melting furnace, and the basic composition design adopted in the example was shown in Table 10, the clarificant combination was shown in Table 11, and analytically pure raw materials were adopted. After the raw materials were prepared according to the formula, the glass batch was placed in the melting furnace and heated at a rate of 3° C./min to 1650° C. and kept for two hours. The molten glass was then poured into a mold and molded, and annealed at a cooling rate of 2° C./min in an annealing furnace at the annealing temperature of 600° C. until cooled to room temperature, and the sample was taken out for cutting, polishing, and testing.

TABLE 10

Basic glass composition of Example 4 (500 g glass batch)

| $SiO_2$ | $Al_2O_3$ | MgO | $K_2O$ | $Na_2O$ | CaO | $B_2O_3$ | $ZrO_2$ | SrO | $Er_2O_3$ |
|---|---|---|---|---|---|---|---|---|---|
| 63.5 | 13 | 1 | 2 | 2 | 5 | 5 | 2.5 | 3 | 2.7 |
| 411.5 | 65 | 5 | 10 | 10 | 25 | 25 | 12.5 | 15 | 13.5 |

TABLE 11

Clarificant composition of Example 4 (500 g glass batch)

| $Na_2SO_4$ | SnO |
|---|---|
| 1 | 1.5 |

The glass samples prepared in the example were tested and the test results were shown in Table 12. The transmittance curves were shown in FIG. 4:

TABLE 12

Test results of Example 4

Figure 4:
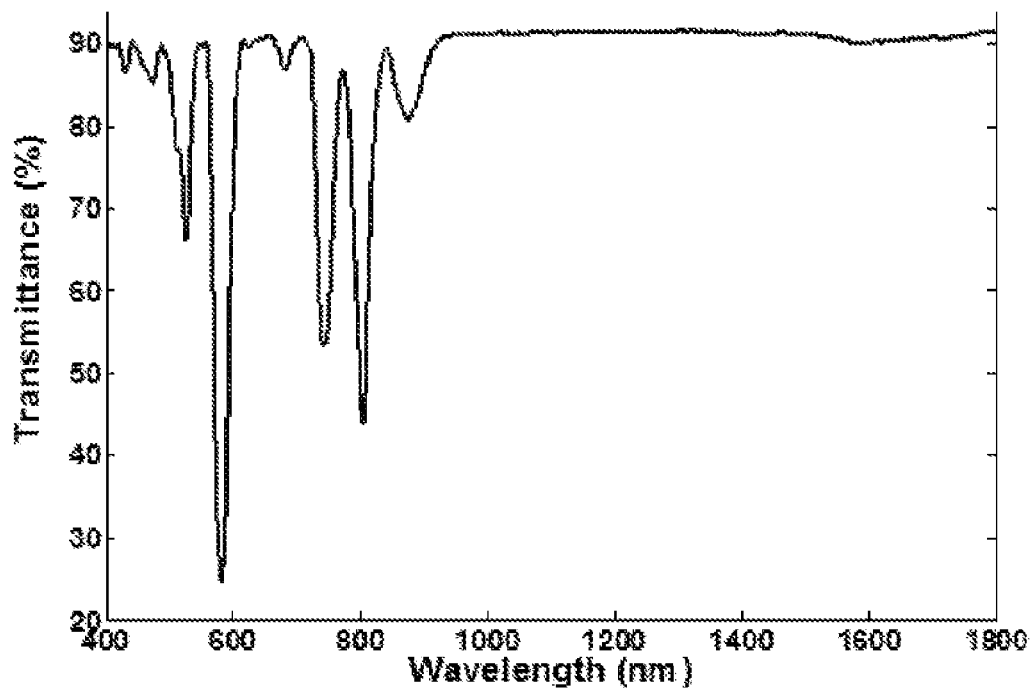
FIG. 4 is a curve graph of transmittance according to Example 4 of the invention.

| Strain point (° C.) | | |
|---|---|---|
| 690 | Transmittance curves | See FIG. 4 |

The glass according to the invention can provide a glass formula which exhibits pink in visible light and has a high thermal stability index. The aluminosilicate glass provided by the patent has good visual effect and can be used better in high-grade building glass, and improves the safety of use for harsher working environments due to higher thermal stability.

The preferred embodiments of the invention have been described in detail above. It should be understood that those skilled in the art will be able to make many modifications and variations in accordance with the teachings of the invention without the need for creative labor. Those skilled in the art will, within the scope of the invention, be protected within the scope of the claims by means of logical analysis, reasoning, or limited experimentation in accordance with the teachings of the invention.

What is claimed is:

1. A pink aluminosilicate glass, comprising a glass former, a network intermediate oxide, a network modifier oxide, a network former oxide, a network modifier, a colorant, and a clarificant;

wherein:

a strain point of the pink aluminosilicate glass is greater than 550° C.;

the network modifier oxide is $B_2O_3$ accounting for 0-10% by mass of the total mass of the glass, or the network modifier oxide comprises CaO accounting for 1-10% by mass of, MgO accounting for 1-5% by mass of, $K_2O$ accounting for 5-10% by mass of, and $Na_2O$ accounting for 1-10% by mass of the total mass of the glass;

the network modifier comprises $ZrO_2$ accounting for greater than 2.5% and less than 5% by mass of and SrO accounting for greater than 1% and less than 10% by mass of the total mass of the glass;

the colorant is $Er_2O_3$ accounting for 0.2-3% by mass of the total mass of the glass;

the clarificant is a mixture of SnO and $Na_2SO_4$, which is used for the pink aluminosilicate glass in high viscosity with high temperature state, total content of the clarificant is 0.1-3% of a content of a batch, wherein the SnO content accounts for 10%-80% of the total content of the clarificant;

and the clarificant does not enter the glass structure.

2. The glass of claim 1, wherein, the glass former is $SiO_2$ accounting for 55%-80% by mass of the total mass of the glass.

3. The glass of claim 1, wherein, the network intermediate oxide is $Al_2O_3$ accounting for 5-22% by mass of the total mass of the glass.

* * * * *